Dec. 2, 1969 NOBORU MURAYAMA 3,482,215

SYSTEM FOR REVERSIBLY CONNECTING A PLURALITY OF DATA PROCESSING EQUIPMENTS

Filed Dec. 9, 1966 5 Sheets-Sheet 1

Dec. 2, 1969 NOBORU MURAYAMA 3,482,215

SYSTEM FOR REVERSIBLY CONNECTING A PLURALITY OF DATA PROCESSING EQUIPMENTS

Filed Dec. 9, 1966 5 Sheets-Sheet 2

United States Patent Office 3,482,215
Patented Dec. 2, 1969

3,482,215
SYSTEM FOR REVERSIBLY CONNECTING A PLURALITY OF DATA PROCESSING EQUIPMENTS

Noboru Murayama, Tokyo, Japan, assignor to Kabushiki Kaisha Ricoh, Tokyo, Japan, a corporation of Japan Filed Dec. 9, 1966, Ser. No. 600,468
Int. Cl. G11b *13/00;* G06f *1/00, 7/00*
U.S. Cl. 340—172.5 17 Claims

ABSTRACT OF THE DISCLOSURE

This invention relates to a special purpose computer system for controlling the reversible flow of data between various I-O devices. For example, data may be transferred from a typewriter to a paper tape punch in one mode of operation of the system while in another mode of operation the flow of information is from paper tape to the typewriter. In both of the above modes of operation, the data transfer channel employed is the same. Further, a single control unit regulates all modes of operation.

This invention relates to improved apparatus for interconnecting a plurality of data processing devices such as a typewriter, tape punch, or drive, and a tape reader.

In particular, this invention relates to improved apparatus for reversibly connecting data processing equipment such as a typewriter or printer with a tape punch or drive. That is, in a first mode of operation, the typewriter is connected to the tape punch or drive for creating a punched or magnetized tape in accordance with the characters typed at the typewriter. In a second mode of operation, the flow of information may be reversed so that a punched or magnetized tape may be read by a tape reader, the characters detected from the tape actuating the typewriter or a printer.

The second mode of operation may be further modified to the extent that the detected characters may also cause a further tape to be punched or magnetized in accordance with the particular character detected.

Although the invention will be described in terms of three data processing devices in particular (that is, a typewriter, a paper tape punch, and a paper tape reader), it will, of course, be obvious to those having ordinary skill in the data processing art that these particular devices may be replaced by other types of data processing devices. For instance, punched cards or magnetic tape may be used in lieu of paper tape. Further, various optical input and output devices may also be employed.

Thus, it is a primary object of this invention to provide improved apparatus for reversibly interconnecting a plurality of data processing devices.

It is a further object of this invention to provide improved apparatus for reversibly interconnecting a typewriter with a paper tape punch and a paper tape reader.

Figures 1, 3:
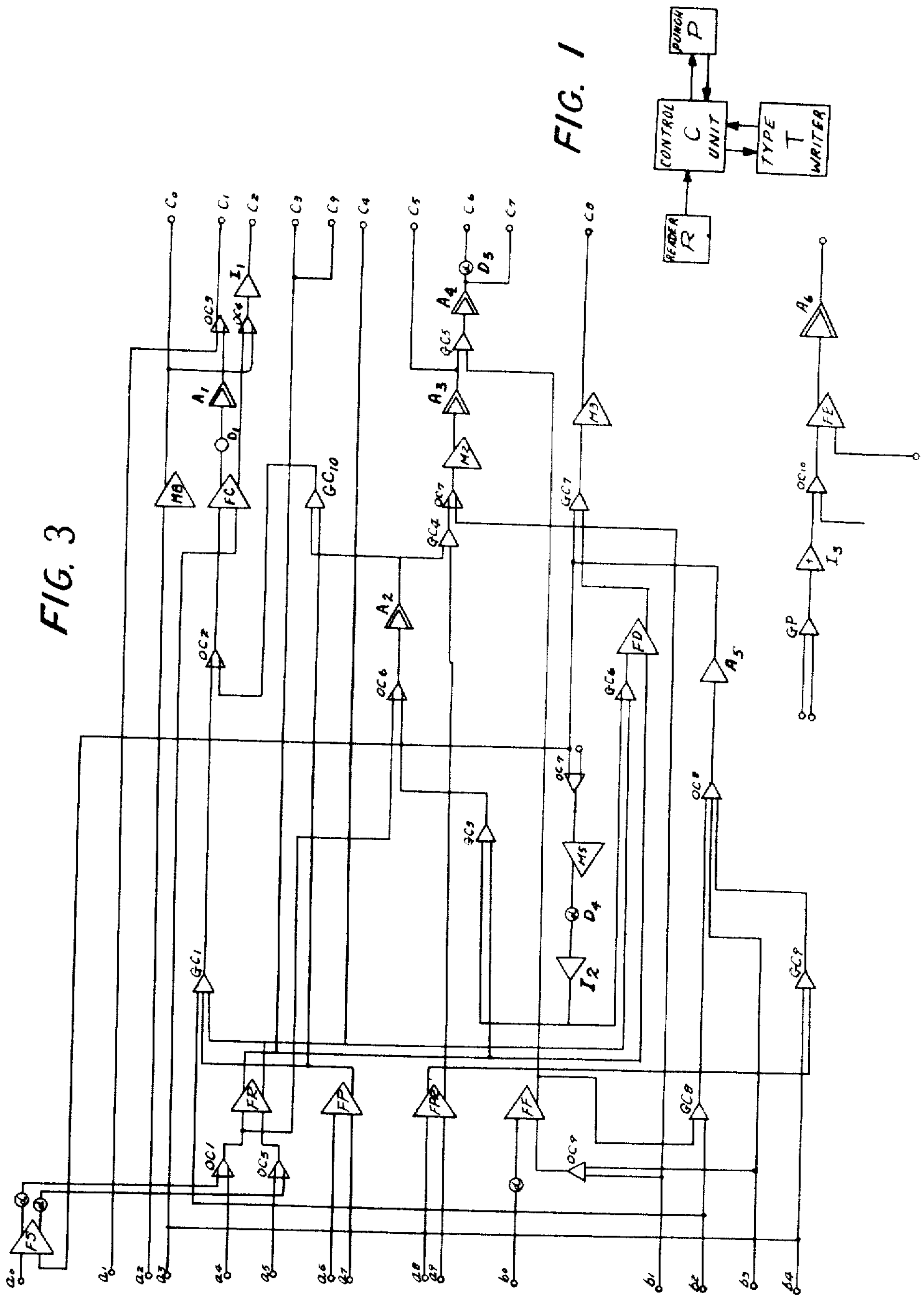
Figure 2A:
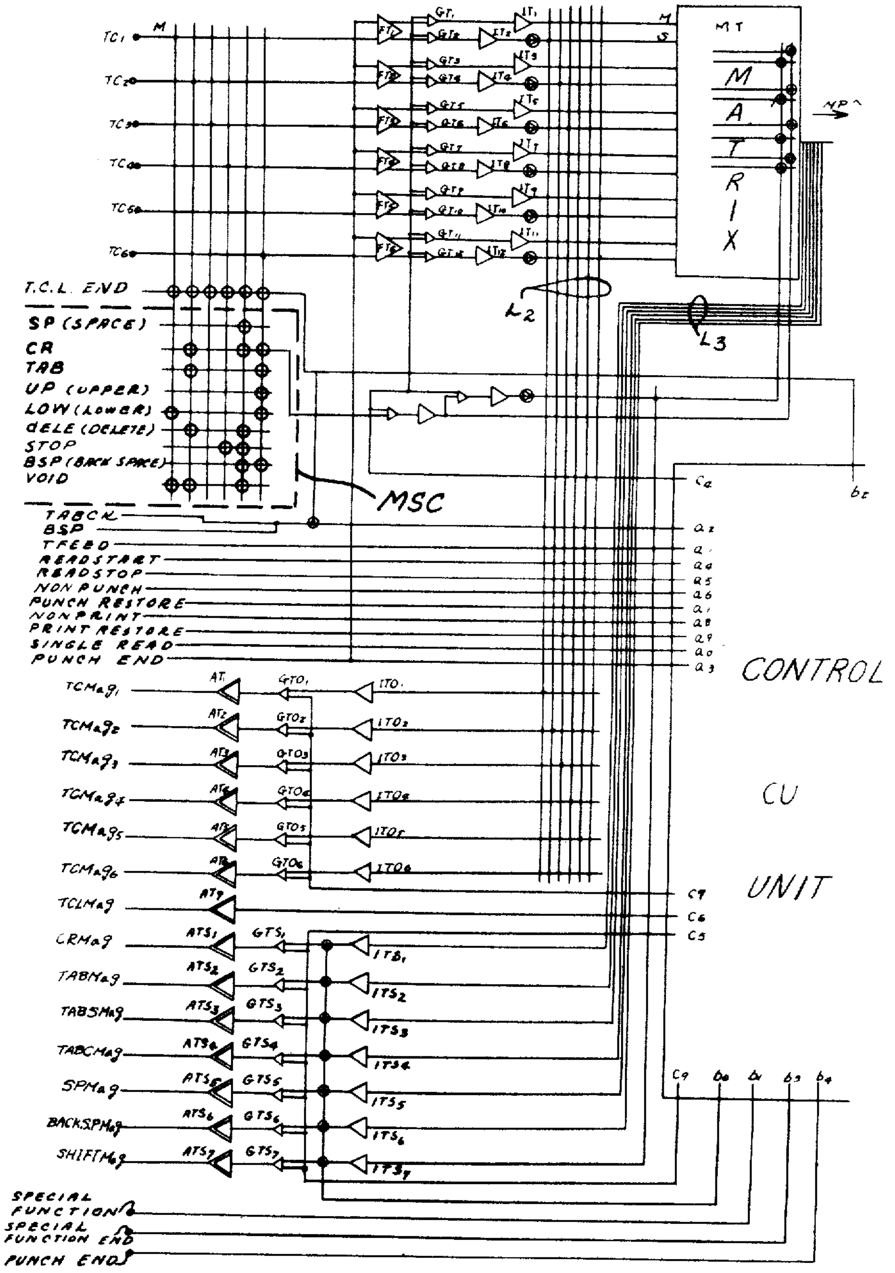
Figure 2B:
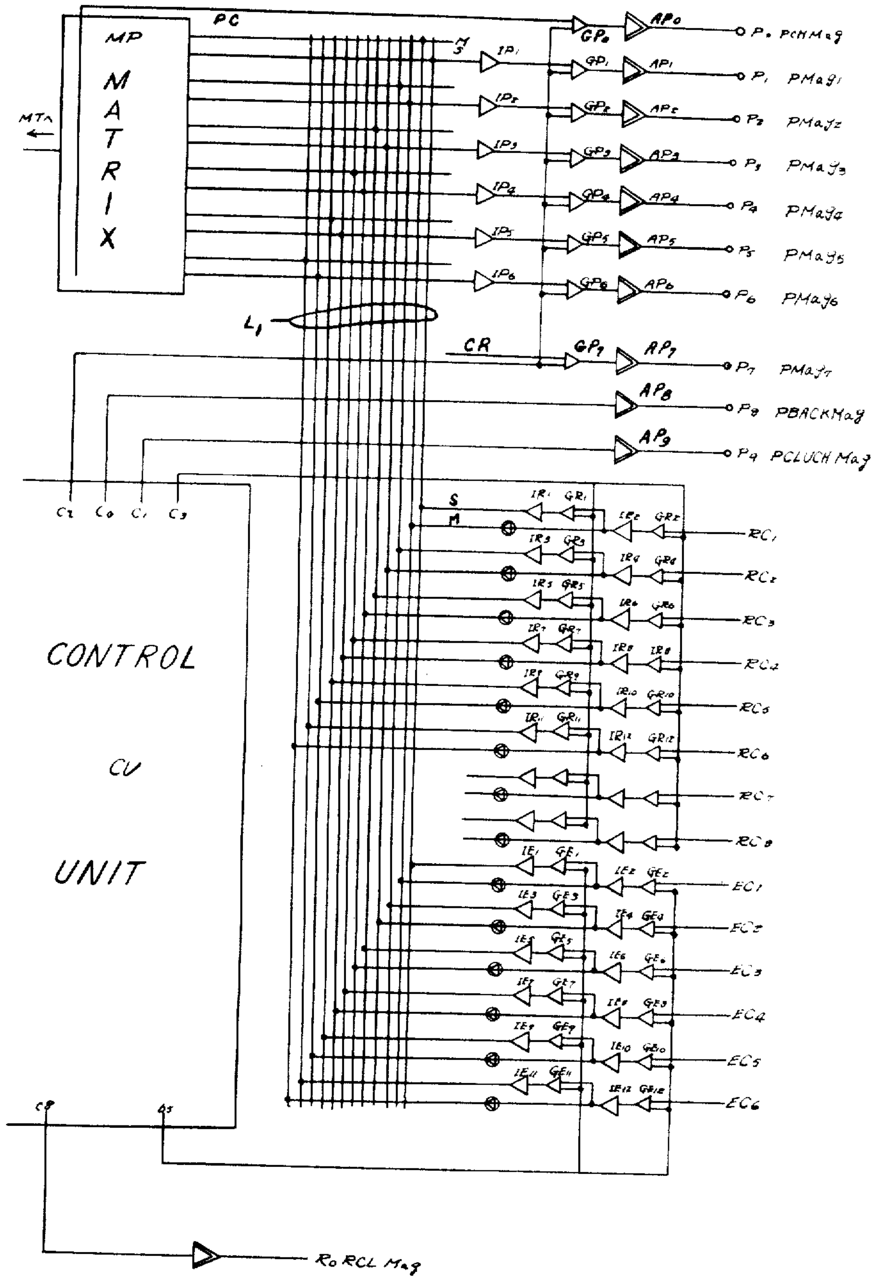
Figure 4A:
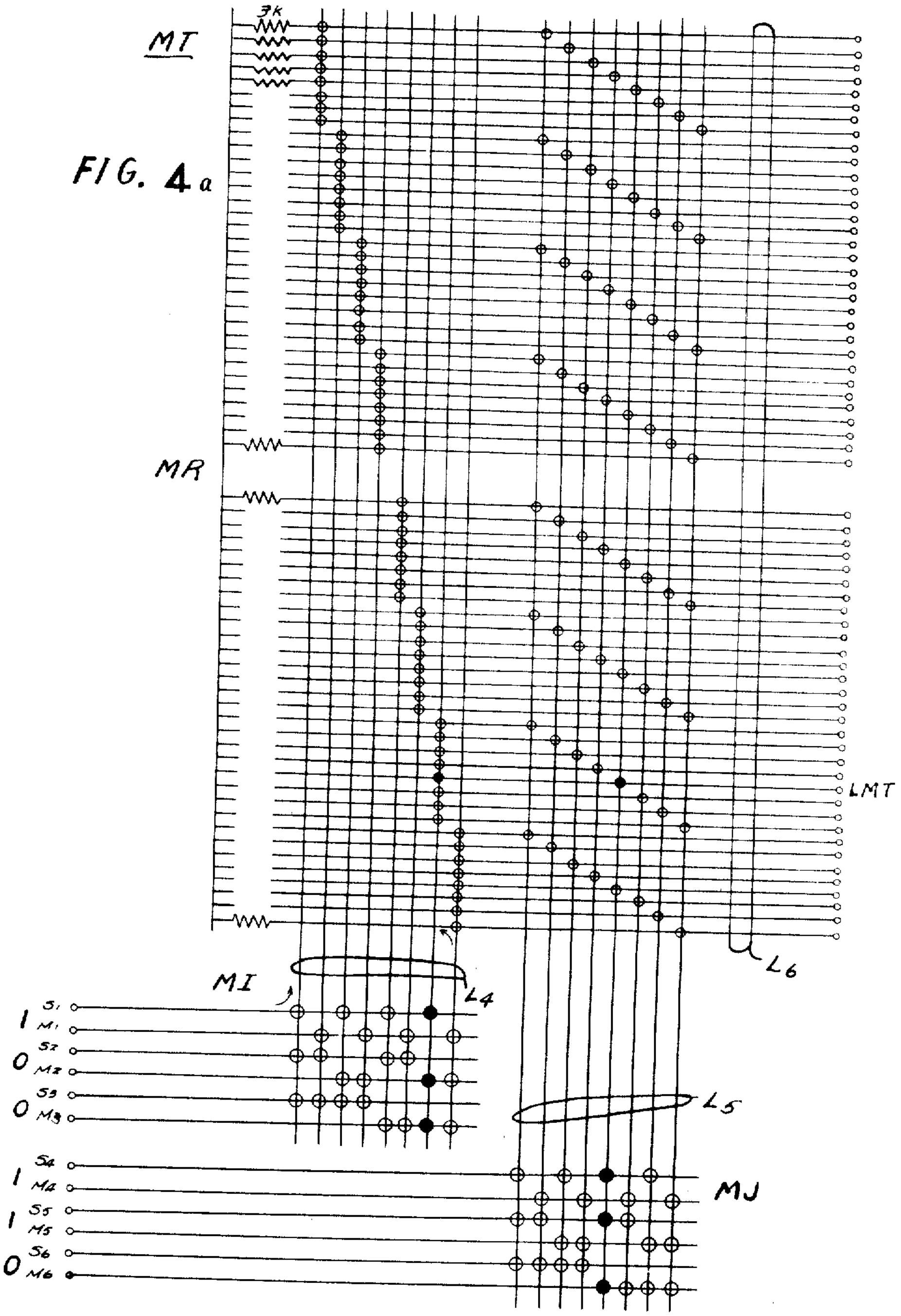
Figure 4B:
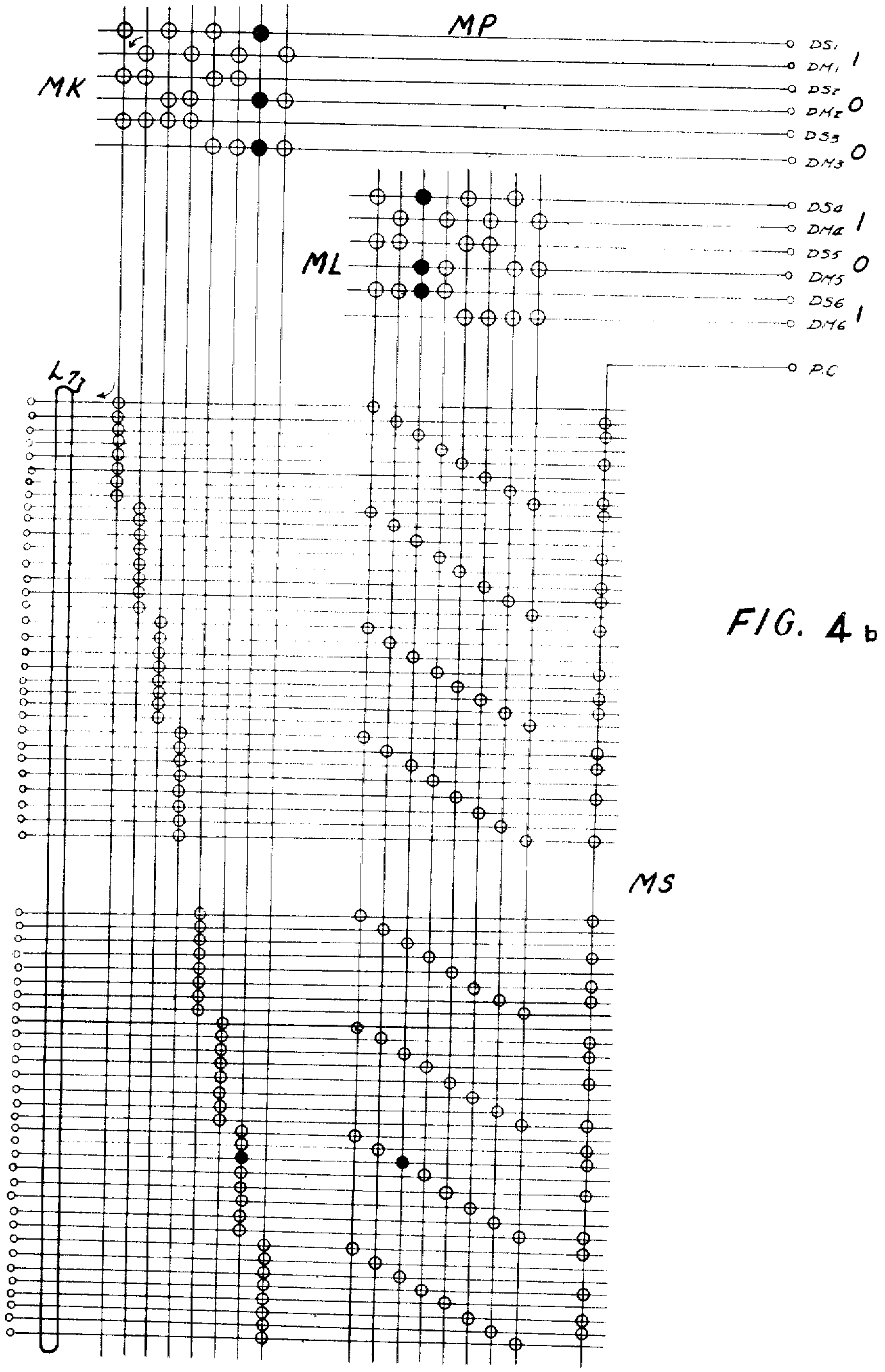

Other objects and advantages of this invention will become apparent upon reading the appended claims in conjunction with the following detailed description and the attached drawings, in which:

FIGURE 1 is a block diagram of a preferred embodiment of the overall system;

FIGURES 2*a* and 2*b*, which are on separate sheets of the drawing, together diagrammatically illustrate in more detail a preferred illustrative embodiment of the control section shown in FIGURE 1;

FIGURE 3 is a preferred illustrative embodiment of the central processing unit, broadly shown in FIGURE 2; and FIGURES 4*a* and 4*b* illustrate one embodiment of a data conversion and colating matrix which may be employed with this invention.

Referring to FIGURE 1, there is shown the overall block diagram of the invention. Thus, a paper tape Reader R, a paper tape punch P, and a typewriter T are reversibly interconnected by control section C. In the first mode of operation characters typed at the typewriter T will be transferred to a control section C for conversion to a code suitable for the paper tape apparatus, if necessary. Code conversion circuitry is well known to those having ordinary skill in this art. However, an illustrative type of code conversion circuitry will be briefly described hereinafter with respect to FIGURES 4*a* and 4*b*.

In the second mode of operation, a paper tape is read by reader R and the detected character is applied to control section C. In control section C, the character code is converted, if necessary, to one suitable for typewriter T and is then applied to the typewriter for printing thereof.

In the third mode of operation, the paper tape reader applies characters detected from a first paper tape to control section C. After code conversion, if any, the detected character is then applied to paper tape punch P.

In a fourth mode of operation, the second and third modes may be combined so that the information detected by reader R is applied to both typewriters T and paper punch P.

Reference should now be made to FIGURES 2*a* and 2*b*. In FIGURE 2*a*, a plurality of terminals $TC_1$–$TC_6$ are connected to a typewriter. Whenever a normal character is typed, a particular combination of the lines $TC_1$–$TC_6$ are activated. Since there are six lines, it follows that 64 different characters at the typewriter are provided for. Lines $TC_1$–$TC_6$ are applied to SET inputs of flip-flops $FT_1$–$FT_6$, respectively. The SET outputs of flip-flop $FT_1$–$FT_6$ are respectively applied to AND gates $GT_2$, $GT_4$, $GT_6$, $GT_8$, $GT_{10}$, and $GT_{12}$. The RESET outputs of flop-flops $FT_1$–$FT_6$ are, respectively, connected to AND GATES $GT_1$, $GT_3$, $GT_5$, $GT_7$, $GT_9$, and $GT_{11}$. AND GATES $GT_1$–$GT_{12}$ are also conditioned by a timing pulse applied from $c_4$ of central processing unit CU. The outputs of $GT_1$ and $GT_2$, respectively, correspond to MARK and SPACE signals, this also being applicable to gates $GT_3$–$GT_{12}$. Gates $GT_1$–$GT_{12}$ are respectively connected to inverters $IT_1$–$IT_{12}$. Thus, if a MARK signal M appears on line $TC_1$, as shown in FIGURE 2*a*, MARK signal M and SPACE signal S will respectively occur at the outputs of inverters $IT_1$ and $IT_2$.

The inverters $IT_1$–$IT_{12}$ are all connected to code conversion matrix MT. In many applications code conversion will be necessary since the character code employed by the typewriter is different from that employed by the paper tape apparatus. Thus, the typewriter character code applied to matrix MT is decoded and applied to matrix MP of FIGURE 2*b* where the decoded signal is reconverted to a code suitable for the paper punch apparatus. The reconverted character code is then applied to inverters $IP_1$ through $IP_6$. There are twelve output lines shown from matrix MP and, as will become more apparent in the detailed discussion of FIGURES 4*a* and 4*b*, these twelve outputs are composed of six pairs where the signals on the lines of a given pair are mutually exclusive—that is, if one of the given pairs is MARK, the other must be SPACE. This condition always applies unless the matrix is in an All-Zero-Status, as will be explained in more detail hereinafter.

The inverters $IP_1$–$IP_6$ are respectively connected to AND gates $GP_1$–$GP_6$. AND gate $GP_0$ is connected to matrix MP to provide a parity check when desired. Gates $GP_0$–$GP_7$ are connected to a timing pulse originating at $c_2$ and central processor unit CU. Gates $GP_1$–$GP_6$ are employed for the character code. Punchers typically have eight channels. When this is the case, AND gate $GP_7$ is employed, the upper input terminal thereof being connected to the typewriter carriage return (CR) contact key. Amplifiers $AP_0$–$AP_7$ are respectively connected to terminals $P_0$–$P_7$.

Amplifiers $AP_8$ and $AP_9$ are actuated by control signals respectively originating from $C_1$ and $C_3$ at central processor unit CU. The amplifier $AP_8$ and $AP_9$ are respectively connected to terminals $P_8$ and $P_9$, which, in turn, are respectively connected to the punch back space magnet P BACK Mag (not shown) and the punch clutch magnet P CLUTCH Mag (also not shown). The terminals $P_1$–$P_6$ are respectively connected to the code magnets of the puncher, while terminal $P_0$ is connected to the parity check magnet of the puncher. Since the structural details of the puncher form no part of the invention and since these are well known to those having ordinary skill in this art, they will not be further discussed.

Reference should now be made to FIGURE 2*a*. Besides the normal characters which are transferred to the punch from the typewriter various special functions must also be provided for. Thus, towards the end of the typewriter printing cycle the typewriter character clutch stops, thereby generating a pulse which is applied to $b_2$ in central processing unit CU from the terminal indicated T. CL. END. Further special functions are SPACE (SP), carriage return (CR), tape, upper case (UP), lower case (LOW), delete (DELE), stop, back space (BSP), and void. The matrix MSC codes the signals occurring on the lines respectively associated with the above functions as shown in FIGURE 2*a*. The six output lines of matrix MSC are respectively connected to line $TC_1$–$TC_6$. Thus, each of the typewriter special functions are processed in the same manner as are the normal typewriter characters.

Referring now to FIGURE 2*b*, the terminals $RC_1$–$RC_6$ are respectively connected to the paper tape reader code magnets. It will be assumed that a six-channel code is employed in the following description of the invention. Thus, when a six-channel code is employed, a given combination of terminals $RC_1$–$RC_6$ is activated depending on the particular character read from the paper tape by the reader. Since six terminals are made available, 64 combinations are possible, thereby corresponding with the requirements at the typewriter or printer. Terminal $RC_1$–$RC_6$ are respectively connected to AND gates $GR_2$–$GR_{12}$. The outputs of AND gates $GR_2$–$GR_{12}$ are respectively connected to inverters $IR_2$–$IR_{12}$. The outputs of inverters $IR_2$–$IR_{12}$ are respectively connected to gates $GR_1$–$GR_{11}$, which, in turn, are respectively connected to inverters $IR_1$–$IR_{11}$. Thus, if a MARK signal occurs at terminal $RC_1$, a MARK signal will occur at the output of inverter $IR_2$ while a SPACE signal will occur at the output of $IR_1$. The output from inverters from $IR_1$–$IR_{12}$ are connected to matrix MP via lines $L_1$. Matrices MT and MP are capable of transmitting signals in either direction therethrough. Thus when the coded character read by the paper tape reader is applied to matrix MP, a decoded signal occurs on the output line MT thereof, the decoded signal is applied to matrix MT where it is reconverted to a code suitable for the typewriter. The reconverted character code is then applied over lines $L_2$ to inverters $ITO_1$–$ITO_6$, which in turn are respectively connected to AND gates $GTO_1$–$GTO_6$. Gates $GTO_1$–$GTO_6$ are also conditioned by a timing signal originating from $c_7$ at central processor unit CU. The output of gates $GTO_1$–$GTO_6$ are respectively connected to amplifiers $AT_1$–$AT_6$. These amplifiers are respectively connected to the typewriter code matrix $TCMag_1$–$TCMag_6$, these magnets not being shown and constituting a part of typewriter apparatus which is well known to those having ordinary skill in this art.

The typewriter clutch magnet TCLMag (not shown) is actuated by a timing signal applied from $c_6$ and processor CU through amplifier $AT_7$.

Whenever a special function character is read by the paper tape reader, this special function will be decoded by matrix MP and applied over lines $L_3$ to inverters $ITS_1$–$ITS_6$. The outputs of inverters $ITS_1$–$ITS_6$ are respectively applied to gates $GTS_1$–$GTS_6$ and then to amplifier $ATS_1$–$ATS_6$. When a special function is required, there is no need for matrix MT to reconvert the decoded signal from matrix MP and thus the lines $L_3$ are directly connected to the output side of matrix MP when the system is in the second mode of operation, defined hereinbefore.

Referring now to FIGUE 2*a*, the control terminals, from which basic control is exercised over the system, will now be discussed. At terminal READ START a signal is generated whenever a READER ON switch (not shown) located at the reader is actuated initiating the operation thereof. This signal is applied to $a_4$ and processed by central processor unit CU in a manner which will become more apparent with the detailed description of processor CU in connection with FIGURE 3. Terminal READ STOP is connected to $a_5$ of processor CU. A signal occurs on this line whenever a READER OFF switch (not shown) at the paper tape reader is switched so as to stop the reader.

The terminals NON-PUNCH and PUNCH RESTORE signals are respectively applied to $a_6$ and $a_7$ whenever the punch is respectively in its inactive or active state. At terminals NON-PRINT and PRINT RESTORE, signals are respectively applied to $a_8$ and $a_9$ whenever the typewriter is in its inactive or active state. At terminal SINGLE READ a signal is applied to $a_0$ whenever a single character only is read from the tape by the reader. At the terminal PUNCH END a signal is applied to $a_3$ and $b_4$ of the processor CU at the end of any punching cycle at the punch.

At terminal SPECIAL CODE, a pulse occurs whenever one of the special functions (SP, CR, etc.) occur, this pulse being applied to terminal $b_0$. At the terminal SPECIAL KEY END a pulse occurs whenever one of the special functions (SP, CR, etc.) have been completed, this pulse being applied to terminal $b_3$. At the terminal SHIFT END a pulse occurs whenever a shift operation is completed at the typewriter, this pulse being applied to $b_1$ of processor CU.

Terminal $a_1$ is connected to terminal T FEED, at which a pulse occurs when the tape is fed into the punch. Terminal $a_2$ is connected to terminal BSP, at which a pulse occurs when the punch is actuated to backspace the tape.

Reference should now be made to FIGURE 3 wherein is shown a detailed circuitry comprising central processor unit CU. Terminal $a_0$, at which occurs a pulse whenever a single character is required to be read from the paper tape, is connected to the RESET input of flip-flop FS whereas the SET and RESET outputs of flip-flop FS are respectively connected to OR circuits $OC_1$ and $OC_5$. Terminal $a_1$, at which the tape feed operation occurs, is connected to an input of OR circuit $OC_3$. Terminal $a_2$, at which occurs the BACKSPACE punch function, is applied to multivibrator MB, which in turn is connected to terminal $c_0$, which is connected to the means for back spacing the punch.

Terminals $a_3$ and $b_4$ at which occure the PUNCH END function, are connected to the SET input of flip-flop FC. The RESET output of flip-flop FC is connected to differentiator $D_1$, which, in turn, is connected to a double inverter or amplifier $A_1$. The output of amplifier $A_1$ is connected to OR circuit $OC_3$. The output of OR circuit $OC_3$ is connected to terminal $C_1$ which, in turn, is connected to the punch clutch. The two input terminals of OR circuit $OC_4$ are respectively connected to the RESET output of flip-flop FB and the SET output of flip-flop FC. Terminal $c_2$ is connected to the output of $OC_4$ through inverter $I_1$, terminal $c_2$ being connected to the gates $GP_0$–$GP_7$, as shown in FIGURE 2*b*.

Terminal $a_4$, at which occurs the READER ON pulse, is connected to OR circuit $OC_1$ and terminal $a_5$, at which occurs the READER OFF pulse, is connected to OR circuit $OC_5$. The SET and RESET inputs of flip-flop FR are respectively connected to the outputs of OR circuits $OC_5$ and $OC_1$. The output of OR circuit $OC_1$ is also connected to OR circuit $OC_6$. The SET output of flip-flop FR is connected to AND gate $GC_1$, terminal $C_4$ (which controls gates $GT_1$–$GT_{12}$, see FIGURE 2*a*) and AND gate $GC_6$. The reset output of flip-flop FR is connected to terminals $c_3$ and $c_9$ (which are respectively connected to the reader input gates $GR_1$–$GR_{12}$ of FIGURE 2*b* and the typewriter shift magnet gate $GTS_7$ of FIGURE 2*a*), AND gate $GC_3$ and the SET input of flip-flop FD.

Terminals $a_6$ and $a_7$, at which respectively occur the PUNCH OFF and PUNCH ON pulses, are respectively connected to the RESET and SET inputs of flip-flop FP The SET output of flip-flop FP is connected to AND gate $GC_1$ and AND gate $GC_{10}$.

Terminals $a_8$ and $a_9$, at which occur the NON-PRINT and PRINT functions (that is, the typewriter being actuated or not actuated for typing) are respectively connected to the RESET and SET inputs of flip-flop FPR. The RESET output of FPR is connected to the SET input of flip-flop FD while the SET output of flip-flop FPR is connected to AND gate $GC_5$. The output of OR circuit $OC_6$ is connected through amplifier $A_2$ to AND gates $GC_{10}$ and $GC_4$. The output of AND gate $GC_{10}$ is connected to OR circuit $OC_2$, which, in turn, is connected to the RESET input of flip-flop FC.

The output of AND circuit $GC_4$ is connected through OR circuit $OC_7$ to a multivibrator $M_2$, which in turn is connected through amplifier $A_3$, and AND gate $GC_5$ to terminal $c_5$ which controls the special function codes to the typewriter, as shown in FIGURE 2*a*.

Terminal $b_0$, at which occurs a pulse whenever a special function is performed, is connected through differentiator $D_2$ to the RESET input of flip-flop FF. The SET input of flip-flop FF is connected to terminals $b_1$ and $b_3$ through OR circuit $OC_9$. The SET output of flip-flop FF is connected to AND gate $GC_5$, the output of which is connected to amplifier $A_4$. Amplifier $A_4$ output is differentiated by differentiator $D_3$ and applied to the typewriter clutch control mechanism via terminal $c_6$. The output of amplifier $A_4$ is also applied directly to terminal $c_7$ to control the normal code output gates $GTO_1$–$GTO_6$, as shown in FIGURE 2*a*.

Terminal $b_2$, at which occurs the typewriter END PULSE is connected to AND gates $GC_1$ and $GC_8$. The other input of $GC_8$ is connected to the SET output of flip-flop FF. OR circuit $OC_8$ connects AND gate $GC_7$, $b_3$, and AND gate GC9 to amplifier $A_5$. The RESET output of flip-flop FD is also connected to AND gate GC7, the output of AND gate GC7 being applied to multivibrator $M_3$ which, in turn, applies a pulse to terminal $c_8$, thereby controlling the reader clutch mechanism. The output of AND circuit $A_5$ is also connected to the reset input of flip-flop FS and OR circuit $OC_7$. The output of OR circuit $OC_7$ is applied to multivibrator $M_5$ which applies a pulse to differentiator $D_4$. The output of differentiator is applied through inverter $I_2$ to AND gates $GC_3$ and $GC_6$.

Terminal $b_4$, at which occurs the PUNCH END pulse, is connected to terminal $a_3$ and, thus, the occurrence of this pulse on either $a_3$ or $b_4$ will be connected to the SET input terminal of flip-flop FC and AND gate $GC_9$.

Having now described the structure of the improved apparatus for accomplishing the results of this invention, the operation thereof will now be described. As defined hereinbefore, in the first mode of operation, information is transferred from the typewriter to the paper tape. Before the typewriter key is struck, the following conditions must be met:

(1) Flip-flop FP must be set by pressing the PUNCH RESTORE key, thereby pulsing terminal $a_7$ with an appropriate SET signal and (2) Flip-flop FR must be set pressing the READER OFF key which, in turn, causes a pulse to occur at terminal $a_5$ which is applied through OR circuit $OC_5$ to set flip-flop FR. Assuming that a normal character is to be punched into the paper tape, one of the character keys of the typewriter is first pressed, thereby causing an appropriate combination of MARKS and SPACES to occur at terminals $TC_1$–$TC_6$. Towards the end of the print cycle, T.C. END contact makes, thereby pulsing terminal $b_2$ which, in turn, causes a pulse to be applied through AND gate $GC_1$ to the RESET input terminal of flip-flop FC through OR circuit $OC_2$. AND gate $GC_1$ is conditioned since flip-flops FR and FP are both SET. When flip-flop FC is RESET, the RESET output thereof is applied to terminal $c_1$ through differentiator $O_1$, amplifier $A_1$ and OR circuit $OC_3$. Since terminal $c_1$ is connected to the punch clutch, this clutch is actuated. The SET output of flip-flop FC is applied through OR circuit $OC_4$ and inverter $I_1$ to terminal $c_2$ which controls the punch code magnets via $GP_1$–$GP_6$, as shown in FIGURE 2*b*.

Since the SET output from flip-flop FR is ONE and since this output is applied to terminal $c_4$, the coded character appearing at terminals $TC_1$–$TC_6$, of FIGURE 2*a*, is transmitted through gates $GT_1$–$GT_{12}$ to decoding matrix MT. As will be described in more detail hereinafter, the decoded output from matrix MP is recorded by matrix MT to a code which is compatible with the punch apparatus. The output of matrix MT is applied to the punch code magnets through gates $GP_1$–$GP_6$, as described hereinabove. The transfer of information from the typewriter to the paper tape punnch is now complete.

Towards the end of the punch operation, a pulse is generated at terminal $a_3$ and applied to the SET input of flip-flop FC. Thus, this flip-flop will be returned to the RESET state before the next normal character is typed.

Assuming that a special function (such as SPACE)' is performed during the first system, the operation is as follows. The SP(SPACE) line is pulsed, see FIGURE 2*a*. This send as MARK signal to line $TC_5$, which SETS flip-flop $FT_5$. The remainder of the operation is exactly the same as that described above for normal character operation.

The punch may be back spaced by pressing the appropriate key on the punch, thereby generating a pulse at terminal $a_2$ which triggers multivibrator MB, which, in turn, generates a pulse of appropriate length at terminal $c_0$, see FIGURE 2*b*, and thereby causes the punch to backspace.

The second mode of operation of the system (where information is transferred from the paper tape by the reader to the typewriter or printer) will now be described. First, the following conditions must be met:

(1) The typewriter switch must be ON thereby activating the typewriter. This causes FPR to be SET via $a_9$; and (2) The punch control switch must be in its OFF position, thereby resetting flip-flop FP via terminal $a_6$.

With the above conditions met, assume further that a normal character is to be typed. When the reader START key is pressed, a pulse occurs at terminal $a_4$ which resets flip-flop FR, causing a ONE signal to occur at the RESET output of flip-flop FR and be applied to terminal $c_3$ which, in turn, is applied to gates $GR_1$–$GR_{12}$ of FIGURE 2*b*, thereby causing a character code to be read from the tape. The output of OR circuit $OC_1$ is also applied to AND gate $GC_4$ through OR circuit $OC_6$ and amplifier $A_2$. Since $a_9$ is pulsed, flip-flop FPR is set and the SET output thereof is also applied to AND gate $GC_4$, thereby causing a pulse to be applied to multivibrator $M_2$ through OR circuit $OC_7$. The upper side of $M_2$ turns to the ONE state and holds this status for about 30 milliseconds and then returns to zero automatically.

Flip-flop FF is set (that is, its lower SET output is ONE) because no special function signal has occurred to reset the flip-flop FF over line $b_0$. Thus, both the inputs to the AND gate $GC_5$ are conditioned and a pulse is passed to terminal $c_7$ via amplifier $A_4$, terminal $c_7$ being connected to gates $GTO_1$–$GTO_6$ to control the application of the typewriter character code to typewriter code magnets $TCMag_1$-$TCMag_6$ through gates $GTO_1$–$GTO_6$. This character code converted version of the character code occurring at the output terminal of gates $GR_1$–$GR_{12}$ of FIGURE 2*b*, after it has passed through matrices MP and MT. A more detailed discussion of the operation of these matrices will be given hereinafter.

Referring now to FIGURE 3, the output pulse from AND gate $GC_5$ is also applied to terminal $c_6$ after passing through amplifier $A_5$ and differentiator $D_3$. The signal at terminal $c_6$ controls the typewriter clutch, see FIGURE 2*a*. Thus, the character has now been read from the paper tap and printed out at the typewriter. Towards the end of the typewriter printing cycle, the typewriter clutch end contact makes and a pulse occurs on line $b_2$ which is applied to AND gate $GC_8$. Since flip-flop FF is set, AND gate $GC_8$ is conditioned and a pulse is applied to OR circuit $OC_8$ and then to AND gate $GC_7$ through amplifier $A_5$. Further, since flip-flop FR has been reset, a ONE signal is applied to the set input of flip-flop FD, thereby also causing a ONE signal to be applied to AND gate $GC_7$. Hence. the pulse from $A_5$ is applied to multivibrator $M_3$ through gate $GC_7$. Upon actuation of multivibrator $M_3$, a 10 millisecond pulse is applied to terminal $c_8$, which, in turn, causes the reader feed cycle to be performed and the reader to advance by one character, this character being read into code gates $GR_1$–$GR_{12}$ of FIGURE 2*b*.

The output pulse from amplifier $A_5$ is also applied to multivibrator $M_5$ through OR circuit $OC_7$. Thus a 30 millisecond pulse is generated and applied to differentiator $D_4$. Inverter $I_2$ responds only to the trailing pulse resulting from the differentiation thereby providing a pulse delayed 30 milliseconds from that occurring at the output of $A_5$. This pulse is applied to AND gate $GC_3$, which is conditioned by the RESET output of flip-flop FR to pass the delayed pulse through OR circuit $OC_6$ and amplifier $A_2$ to $GC_4$. Thus, a complete cycle has now been described inasmuch as the original pulse generated on $a_4$ when the reader start button was pushed was also applied to $GC_4$ to initiate the transfer of information from the reader to the typewriter.

The cycle just described can be stopped by pressing the read stop key and thereby generating a pulse on $a_5$ which sets flip-flop FR through OR circuit $OC_5$ and thereby causes the RESET output of flip-flop FR to go to ZERO, which, in turn, prevents gate $GC_3$ from passing the delayed pulse from $I_2$. Thus the description of the second mode of operation of the system is now complete.

Assuming a special function code is transferred to the typewriter from the reader, a pulse will occur at terminal $b_0$ from the punch and will reset flip-flop FF. Assume that the code for the SPACE function is read by the reader. This code will transfer to matrix MP via gates $GR_1$–$GR_{12}$ where it is decoded and transferred to AND gate $GTS_5$ (FIGURE 2*a*) via one of lines $L_3$. $GTS_5$ is also conditioned by the pulse which occurs at $c_5$ from AND $GC_4$ as described above for the normal character operation. Thus the SPACE function control magnet SPMag is energized and the SPACE function is performed.

At the completion of the SPACE operation a pulse is generated at terminal $b_3$, which returns flip FF to its SET state thereby conditioning the system for normal character operation again. The pulse at $b_3$ is also applied to OR circuit $OC_6$ thereby commencing the read cycle of the system as described for normal character operation.

A slight variation on the second mode of operation occurs when it is desired to read one and only one character from the tape and have it printed out by the typewriter. This may be done by pressing the SINGLE READ key at the reader and thereby causing a pulse to occur at terminal $a_0$, this resets flip-flop FS thereby causing a pulse to occur at the output of OR circuit $OC_1$ which resets flip-flop FR and conditions AND gate $GC_4$ and thus a character is printed as described above. However, the cycle will not be repeated because the output of amplifier $A_5$ is also applied to SET input of flip-flop FS which causes flip-flop FR to be set through OR circuit $OC_5$. With flip-flop FR set, the delayed pulse from $I_2$ cannot be passed by AND circuit $GC_3$ (as described above with the reader stop operation), and thus only a single character is printed by the typewriter.

The third mode of operation of the system will now be described, this mode corresponding to the reader to punch operation, which may take place by itself or in combination with the reader to typewriter operation. To effectuate the reader to punch operation by itself, the following conditions must be met:

(1) The punch ON key must be pressed, thereby setting flip-flop FP via terminal $a_7$, and (2) The reader START key must be pressed, thereby resetting flip-flop FR via terminal $a_4$ and OR circuit $OC_1$. The pulse occurring at output of OR circuit $OC_1$ is applied to the RESET input terminal of flip-flop FC via OR circuit $OC_6$, amplifier $A_2$, AND gate $GC_{10}$, and OR circuit $OC_2$. AND gate $GC_{10}$ is conditioned since flip-flop FP is set as described above. With flip-flop FC reset, the punch clutch terminal $c_1$ and the punch code magnet terminal $c_2$ are energized, as described hereinbefore, with respect to the first mode of operation (typewriter to punch).

The gates $GR_1$–$GR_{12}$ are conditioned from terminal $c_3$ since flip-flop FR has been reset by the pulse occurring at $a_4$ as assumed above. Thus, conditions are satisfied for the transfer of information from the reader through the gates $GR_1$–$GR_{12}$, and through the gate $GP_1$–$GP_6$ to the puncher.

At the end of the punch cycle, the pulse occurs on $a_3$ and $b_4$ thereby setting flip-flop FC and conditioning one of the inputs of AND gate $GC_9$. The other input of AND gate $GC_9$ is conditioned by the RESET output of flip-flop FPR since the reader-to-typewriter operation is not being performed at this time. Thus, an output pulse occurs at gate $GC_9$ which is applied through gate $GC_7$ to the reader clutch magnet to advance the next character through the gates $GR_1$–$GR_{12}$ of FIGURE 2*b*. The output from AND gate $GC_9$ is also applied to multivibrator $M_5$ through OR circuit $OC_7$. A delayed pulse developed from the trailing edge of the output signal generated by multivibrator $M_5$ is applied to OR circuit $OC_6$ from inverter $I_2$ through AND gate $GC_3$. The output of OR circuit $OC_6$ resets flip-flop FC through amplifier $A_2$, AND gate $GC_{10}$ and OR circuit $OC_2$. Thus flip-flop FC is returned to its original condition at the start of the READ cycle and, therefore, the punch clutch and the punch code magnets are reactivated to punch the next character into the tape. This cycle continues until the READER OFF stop button is pushed at which time flip-flop FR is set, thereby preventing AND circuit $GC_3$ from passing any more pulses.

The fourth mode of operation includes the combined operations of reader to punch and reader to typewriter, the conditions necessary for accomplishing this mode of operation are a combination of the conditions already described hereinbefore for the second and third mode of operations taken individually. That is, flip-flop FR must be reset, flip-flop FP must be set and flip-flop FF will be set assuming that a normal character is to be typed. The printing and punching of the characters read from the tape will take place in accordance with the operation described hereinbefore for the second and third modes of operation taken individually. However, after the first character has been read and processed, the Typewriter Clutch End pulse occurring at $b_2$ controls rather than the PUNCH END pulse occurring at terminal $b_4$. Thus, AND gate $GC_9$ is not conditioned to pass a pulse since FPR is reset. However, AND gate $GC_8$ is conditioned to pass a pulse since flip-flop FF is set. The delayed pulse occurring at the output of inverter $I_2$ will pass through amplifier $A_2$ to both AND gates $GC_4$ and $GC_{10}$ to insure that both the typewriter and punch input gates are respectively activated with each character read by the reader.

Referring to FIGURES 4*a* and 4*b*, there are shown matrices MT and MP respectively. These matrices taken together are described in the copending application Ser. No. 558,056, filed June 16, 1966, entitled "Matrix Collating System" and by the same inventor as the present invention. It is intended that the material disclosed in this copending application be specifically incorporated herein. A brief description of the matrices will now be given to aid in the understanding of one illustrative embodiment of the invention. Each of the circles represents diode interconnections whereby a signal can pass in either direction through a particular interconnection. The terminals $S_1$–$S_6$ and $M_1$–$M_6$ respectively correspond to the SPACE and MARK terminals shown at the outputs of inverters $IT_1$–$IT_{12}$ of FIGURE 2*a*. Assuming the information input is from left to right in FIGURE 4*a*, matrices MI and MJ are employed to convert the SPACE and MARK signals to a first code over the lines $L_4$ and $L_5$ which are connected to matrix MR. The matrix MR typically has 64 output lines $L_6$. One of these 64 output lines will be actuated depending upon the particular character or function generated at the typewriter. Thus, if lines $S_1$, $S_4$, $S_5$, and $M_2$, $M_3$, and $M_6$ are energized (corresponding to a character code of 100110) this results in the activation of the line LMT of the 64 lines $L_6$. The particular diodes which will be active to cause this are blacked in FIGURE 4*a*.

As shown in FIGURE 4*b*, there are 64 lines $L_7$ which may be connected to the 64 lines $L_6$ in various ways. For instance, the top line of line $L_6$ may be connected with the top line of lines $L_7$. If so, the decoded signal (corresponding to character code 100110, discussed above with respect to FIGURE 4*a*) appearing at the line LMT will be applied to the line LMP of the lines $L_7$. The diodes of matrices MK, ML, and MS which are active to pass the signal to terminals $DS_1$–$DS_6$ and $DM_1$–$DM_6$ are blacked in in FIGURE 4*b*. Thus, the code of the character applied to the punch magnets is 100101 as opposed to the output code from the typewriter which is 100110. Hence, it can be seen that matrix MT performs character decoding while matrix MP performs character encoding during the typewriter to punch operation when the flow of information is from left-to-right. Together, matrices MT and MP perform a code conversion so that the typewriter character code may be made compatible with the punch character code. Further, it can now be seen how the conversion operation occurs from right-to-left, that is, from matrix MP to MT. If the character code 100101 is read by the reader R and applied to the terminal $DS_1$–$DS_6$ and $DM_1$–$DM_6$ of matrix MP and if the top line of $L_6$ is aligned with the top line of line $L_7$, the output code appearing at terminals $S_1$–$S_6$ and $M_1$–$M_6$ of matrix MT is 100110.

With the foregoing brief description of the operation of the reversible, shiftable collating matrices MP and MT, a description of certain optional features will now be given. In particular, these optional features are a parity check operation and a redundancy operation, both of which are employed to check certain errors which may occur in the system. Thus, if a parity bit is required by the punch, this is made available at the upper terminal of $GP_0$, where the line PC, shown in FIGURES 2*b*, corresponds to the line PC shown in FIGURE 4*b*. Reference to the above-mentioned copending application should be made for the details of how the parity bit is developed at matrix MP. Briefly, during the typewriter to punch operation, the odd or even parity of the character encoded by matrix MP may be calculated and applied to line PC. At the punch, there may be means (not shown) which also calculates the parity of the character punched onto the tape. If the parity calculated at matrix MP does not agree with the parity calculated at the punch, an appropriate parity check signal may be generated at the punch.

During the read operation it may also be desirable to provide a parity check feature. Thus, at the reader the odd or even parity of the character read from the tape is applied to terminal $RC_7$ (terminal $RC_8$ is employed whenever a 7-character code is used). The parity of the character read over terminals $RC_1$–$RC_6$ is also calculated at matrix MP and applied to line PC. Thus the output at terminal $RC_7$ may be compared with the signal on line PC to generate by means (not shown) a parity check signal for the reader operation.

A further error checking feature is provided for checking the code punched into the paper tape. Thus as soon as the code is punched into the tape through terminals $GP_1$–$GP_6$, the punched character is read out and applied to terminals $EC_1$–$EC_6$ and applied to matrix MP over lines $L_1$. If the code is fed back from terminal $EC_1$–$EC_6$ is different in any way from the code gated through gates $GP_1$–$GP_6$ the matrix MP is reduced to its "all-zero" status by appropriate means described in detail in the above-mentioned copending application. Referring to FIGURE 3 there is shown an AND gate GP which is connected to any single pair of DS, DM, or S, M line of FIGURES 4*a* or 4*b*. Generally, for any given pair of SPACE and MARK lines only one of the lines can and must be active. However, when the matrices MP and MT are reduced to their "all-zero" status, this mutually exclusive characteristic of a given pair of SPACE and MARK lines does not hold and both of the lines are in the same condition. Thus, when the matrix is its "all-zero" condition, AND gate GP of FIGURE 3 is conditioned to pass a signal to redundancy check output terminal $T_1$ through inverter $I_3$, OR circuit $OC_{10}$, flip-flop FE, and amplifier $A_6$. Flip-flop FE may be returned to its normal SET condition after the error condition has been corrected Still numerous other modifications of the invention will become apparent to one of ordinary skill in the art upon reading the foregoing disclosure. During such a reading, it will be evident that this invention has provided a unique circuitry for accomplishing the objects and advantages herein stated. Still other objects and advantages, and even further modifications will be apparent from this disclosure. It is to be understood, however, that the foregoing disclosure is to be considered exemplary and not limitative, the scope of the invention being defined by the following claims:

What is claimed is:

1. A system for reversibly innerconnecting data printing means, data recording means and data reading means, said system comprising:

means for transferring coded data (characters or special functions) from said printing means to said recording means to thereby establish a first mode of operation of said system;

means for controlling the operation of said data transferring means during said first mode of operation, said controlling means being responsive to said data printing and recording means;

said data transferring means further including means for transferring data from said reading means to at least one of said printing means and recording means to thereby establish another mode of operation of said system; and said controlling means controlling the transfer of data during said another mode of operation and said controlling means being responsive during said another mode of operation to said reading means and said one printing and recording means.

2. A system, as in claim 1, where said data is transferred to said printing means during said another mode of operation to thereby establish a second mode of operation.

3. A system, as in claim 1, where said data is transferred to said recording means during said another mode of operation to thereby establish a third mode of operation.

4. A system, as in claim 1, where said printing means includes typewriter means actuable by keys disposed at the typewriter means or by a coded typewriter character signal applied to input terminals of said typewriter means, the actuation of said keys generating a coded typewriter character signal at output terminals of said typewriter means, said last-mentioned coded signal being coded the same as the said coded signal applied to said input terminals.

5. A system, as in claim 4, where said recording means includes a medium upon which said coded typewriter character signals are recorded and where said reading means includes means for reading said coded character signal from said recording medium.

6. A system, as in claim 1, where said controlling means includes first, second and third bistable means respectively responsive to said printing, recording, and reading means, and means responsive to the outputs of said bistable means for controlling the said data transferring means depending on the mode of operation.

7. A system, as in claim 6, where said reading means includes means generating a first control signal after said coded data has been read from said recording means, and where said controlling means includes means responsive to said first control signal for causing said reading means to read the next piece of said coded data from said recording means and for causing said data transferring means to transfer said next piece to said one means and thereby causing a cyclic reading of said data.

8. A system, as in claim 7, where said reading means includes means for generating a second control signal whenever it is desired to stop said cyclic reading of said coded data and where said controlling means includes means responsive to said second signal for preventing said cyclic reading of said coded data.

9. A system, as in claim 8, where said reader means includes means for generating a third control signal whenever it is desired to read only one piece of coded data from said recording means and where said controlling means includes means responsive to said third control signal for preventing said cyclic reading after said one piece of data has been read from said recording means.

10. A system, as in claim 6, including first, second, and third gating means respectively connected to said typewriter means, said recording means and said reading means; and said first, second, and third bistable means respectively controlling said first, second, and third gating means depending on the mode of operation of said signal.

11. A system, as in claim 10, where said first and second bistable means control said first and second gating means during the transfer of information from said printing means to said recording means during said first mode of operation.

12. A system, as in claim 10, where said first and third bistable means control said first and third gating means during the transfer of information from said reader means to said printing means during said another mode of operation thereby establishing a second mode of operation.

13. A system, as in claim 10, where said first, second, and third bistable means control said first, second, and third gating means during transfer of information from said reader means to said printing means and said recording means.

14. A system, as in claim 6, including code conversion means responsive to said printing means during said first mode of operation for converting the coded data generated by said printing means to a code suitable for said recording means; said code conversion means also being responsive to the coded data generated by said reading means during said second mode of operation of the system to convert the last-mentioned coded data to a code suitable for said printing means.

15. A system, as in claim 6, including means for determining the parity of the character code generated by said printing means during said first mode of operation and where said recording means includes means for determining the parity of the character recorded thereat, and said system including means for comparing the above-mentioned parities for detecting errors in the transfer of data from said printing means to said recording means.

16. A system, as in claim 6, where said reading means includes means for determining the parity of the coded data read by said reading means and where said system includes means for computing the parity of the character applied to said printing means from said reader means during the second mode of operation and where said system includes means for comparing said parities to determine errors in the transfer of data from said reader means to said printing means.

17. A system, as in claim 6, where said recording means includes means for reading the coded data applied thereto and where said system includes means for comparing the last-mentioned coded data applied with the coded data generated by said printing means to thereby detect errors in the transfer of information from said printing means to said recording means.

References Cited

UNITED STATES PATENTS

| | | | |
|---|---|---|---|
| 2,859,817 | 11/1958 | Tholstrup | 197—20 XR |
| 2,859,851 | 11/1958 | Tholstrup et al. | 197—20 |
| 3,197,618 | 7/1965 | Stanley et al. | 197—20 XR |
| 3,283,871 | 11/1966 | Becking et al. | 197—20 |

RAULFE B. ZACHE, Primary Examiner

U.S. Cl. X.R.

197—20